(12) United States Patent
Wooff et al.

(10) Patent No.: US 7,506,335 B1
(45) Date of Patent: Mar. 17, 2009

(54) METHOD AND APPARATUS FOR SOFTWARE LOADING AND INITIALIZATION IN A DISTRIBUTED NETWORK

(75) Inventors: Douglas Wooff, San Jose, CA (US); Nobushige Akiya, Sunnyvale, CA (US); Matthew Balint, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 432 days.

(21) Appl. No.: 10/725,190

(22) Filed: Nov. 29, 2003

(51) Int. Cl.
G06F 9/44 (2006.01)

(52) U.S. Cl. .................................................. 717/173

(58) Field of Classification Search ......... 717/168–178; 709/201, 226, 221–223, 242, 248, 219–220, 709/202; 713/2, 100, 164, 165, 201; 726/4, 726/6; 714/50, 4, 6
See application file for complete search history.

(56) References Cited

U.S. PATENT DOCUMENTS

| | | | |
|---|---|---|---|
| 5,008,814 A * | 4/1991 | Mathur ....................... 709/221 |
| 5,487,066 A * | 1/1996 | McNamara et al. ......... 370/436 |
| 5,842,011 A * | 11/1998 | Basu ............................. 713/2 |
| 5,948,101 A * | 9/1999 | David et al. ..................... 713/2 |
| 5,960,200 A | 9/1999 | Eager et al. |
| 6,070,012 A * | 5/2000 | Eitner et al. ................. 717/168 |
| 6,202,207 B1 | 3/2001 | Donohue |
| 6,314,565 B1 | 11/2001 | Kenner et al. |
| 6,535,924 B1 * | 3/2003 | Kwok et al. ................. 709/242 |
| 6,611,727 B2 | 8/2003 | Bickley et al. |
| 6,651,186 B1 | 11/2003 | Schwabe |
| 6,675,382 B1 | 1/2004 | Foster |
| 6,742,028 B1 * | 5/2004 | Wang et al. ................. 709/223 |
| 6,854,009 B1 * | 2/2005 | Hughes ....................... 709/220 |
| 6,886,029 B1 | 4/2005 | Pecus et al. |
| 7,010,617 B2 * | 3/2006 | Kampe et al. ................ 709/248 |
| 7,055,148 B2 * | 5/2006 | Marsh et al. ................. 717/172 |
| 7,080,371 B1 | 7/2006 | Amaiz et al. |
| 7,093,124 B2 * | 8/2006 | Girard ......................... 713/164 |
| 7,203,937 B1 | 4/2007 | Kyle et al. |
| 7,240,336 B1 | 7/2007 | Baker |
| 7,299,354 B2 * | 11/2007 | Khanna et al. .............. 713/165 |
| 7,334,222 B2 | 2/2008 | Keller |
| 7,376,945 B1 | 5/2008 | Kakumani et al. |

(Continued)

OTHER PUBLICATIONS

Oreizy, Peyman, et al., "Architecture-Based Runtime Software Evolution", Information and Computer Science, University of California, Irvine, Jun. 1998, pp. 177-186.

Primary Examiner—Tuan Anh Vu
(74) Attorney, Agent, or Firm—Hickman Palermo Truong & Becker LLP

(57) ABSTRACT

A method for software loading and initialization in a distributed network of nodes. A master node provides a node information database and a software package database. A node performing an initial boot requests a boot image and software package download from the master node. The master node finds the node's software configuration information in the node information database and sends the boot image and software packages to the node from the software package database. The node reboots into the boot image and verifies the software versions with the master node. If the node has the correct software, then it completes the boot sequence, otherwise, the master node sends the correct software packages to the node which then continues with the boot sequence.

36 Claims, 8 Drawing Sheets

U.S. PATENT DOCUMENTS

| | | |
|---|---|---|
| 2002/0083316 A1* | 6/2002 | Platenberg et al. .............. 713/2 |
| 2002/0100036 A1 | 7/2002 | Moshir et al. |
| 2002/0133814 A1 | 9/2002 | Bourke-Dunphy et al. |
| 2002/0144248 A1 | 10/2002 | Forbes et al. |
| 2003/0088650 A1* | 5/2003 | Fassold et al. .............. 709/220 |
| 2003/0110482 A1 | 6/2003 | Ferguson et al. |
| 2003/0172135 A1 | 9/2003 | Bobick et al. |
| 2003/0212990 A1 | 11/2003 | Brodkorb et al. |
| 2004/0003266 A1 | 1/2004 | Moshir et al. |
| 2004/0049509 A1 | 3/2004 | Keller et al. |
| 2005/0055692 A1 | 3/2005 | Lupini et al. |
| 2005/0081184 A1 | 4/2005 | Deedwaniya et al. |
| 2005/0198629 A1* | 9/2005 | Vishwanath ................ 717/174 |

* cited by examiner

METHOD AND APPARATUS FOR SOFTWARE LOADING AND INITIALIZATION IN A DISTRIBUTED NETWORK

FIELD OF THE INVENTION

The present invention generally relates to the management, loading, and installation of select software modules onto networked nodes. The invention relates more specifically to a method and apparatus for software loading and initialization in a distributed network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networked computer systems have evolved over the years from simple serially connected computer systems to massively networked computer systems connected via large intranets and the Internet. During this evolution, many different concepts were developed to manage and load core operating software for client computer systems. The issue of how a computer system obtains its operating software and the effects upon the overall networked system by the loading of new operating software on the computer system has been a complex and perplexing problem.

Heterogeneous multi-computer systems, or multi-node systems, contain a number of computer systems that have differing purposes and different software code bases. For example, the current install base of Windows from Microsoft Corporation of Redmond, Wash., encompasses many different versions of Windows distributed across a wide variety of computers. Microsoft maintains servers that store versions of the supported Windows operating system software. A Windows computer periodically queries a server with its current software versions and the server identifies software components that require updates.

Whenever a Windows computer requires a software update of core operating software, the computer notifies the user that an update is required and the user selects the software component(s) to download. The computer then downloads the software component(s) from a main server and installs each component's library modules and code. The computer must then be restarted to complete the component update and execute the new code. This requires that all processes on the computer be halted and restarted, thereby interrupting any tasks that the computer may be performing.

However, if a multi-node system is purposed to perform an uninterruptible operation, such as managing telecommunications links, the restarting of a computer is not acceptable because a telecommunications link will be disturbed. The computer must also be running an operational version of Windows to be able to communicate with the server, therefore, a new computer is useless until a copy of Windows is installed by a user. Further, the reliance on a human being to perform software selection and initiate software downloads is not desirable in stand-alone systems.

Sun Microsystems of Mountain View, Calif., originally created the concept of diskless workstations that performed diskless booting. A server was provided that hosted a single operating system image that was targeted for a homogeneous set of client workstations. When a workstation booted from its resident BIOS, it would connect to its network and request a copy of the operating system image from the server. In response to the request, the server would send the image to the client. The client would load the image into its local memory and boot from the local memory. This approach worked well for homogeneous systems, but could not work with heterogeneous systems. It further required that an entire operating system image be downloaded to a client workstation and did not take into account the problem of managing and updating individual core software components.

Bootstrap protocol, or BOOTP, is an Internet protocol that was developed to allow a host workstation to configure itself dynamically at boot time. BOOTP enables a diskless workstation to discover its own IP address, detect the IP address of a BOOTP server on the network, and find a file on the BOOTP server that is to be loaded into memory to boot the machine. This enables the workstation to boot without requiring a hard or floppy disk drive. However, this approach has the same shortcomings of the Sun Microsystems approach.

The Beowulf Project began at the Goddard Space Flight Center (GSFC) in the summer of 1994. The Beowulf Project was a concept that clustered networked computers running the Linux operating system to form a parallel, virtual supercomputer. It has been demonstrated to compete on equal footing against the world's most expensive supercomputers using common off the shelf components.

Beowulf divides a program into many parts that are executed by many networked computers. For example, all of the nodes in a connected set of computers run on Linux and have a program installed that performs a series of complex calculations. A lead node begins executing the program. The lead node separates the calculations into a number of tasks that are each assigned to a node in the network. While the lead node performs its calculation task, the other nodes are also performing theirs. As each node completes its task, it reports the results to the lead node. The lead node then collects all of the results. This approach is well suited for performing a series of tasks that can be shared among a group of networked computers. However, the drawback to this approach is that it requires that an identical program be distributed to all of the networked computers and it does not contemplate the problems associated with a heterogeneous set of computers that require individual software component updates, nor the management of such components.

Based on the foregoing, there is a clear need for a system that provides for the management of component-level operating software and nodal downloading of such software for a multi-node networked computer system. Additionally, the system would allow a node to identify versions of the software components that it requires to operate and verify its software components with a master node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
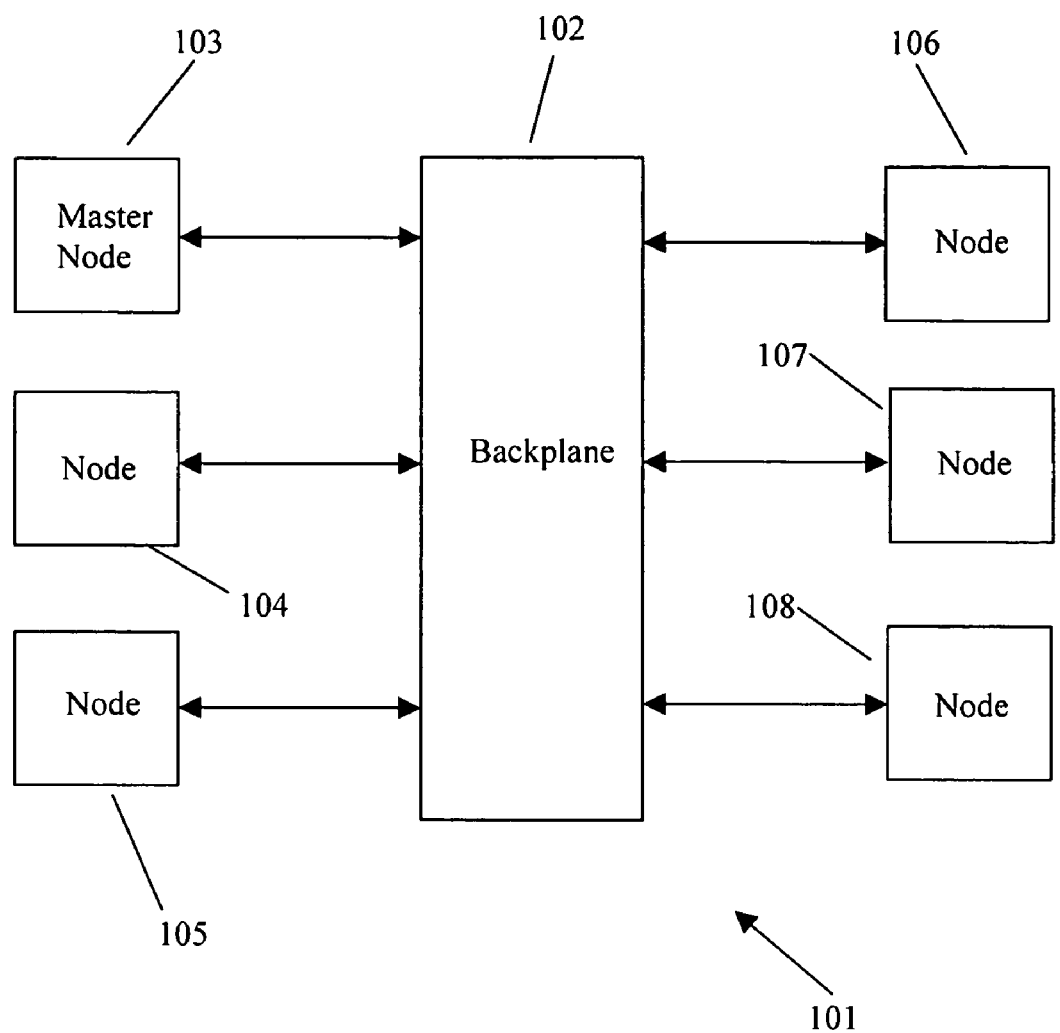
FIG. 1 is a block diagram that illustrates a multi-node router system where nodes communicate through a backplane to perform software loading and initialization according to the invention.

A method and apparatus for software loading and initialization in a distributed network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Description
   2.1 Software Loading and Initialization in a Router System
   2.2 Software Loading and Initialization in a Networked Computer System
   2.3 Master Node Interaction
   2.4 Software Package Loading
   2.5 Task Analysis
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method for software loading and initialization in a distributed network of nodes.

A master node provides a node information database that stores the preferred software version information, type, and other pertinent information for each node in the system. The master node also provides a software package database that contains the software packages and boot images for the nodes in the system. The software package database contains all of the possible boot images and software packages that the nodes in the system will be using as well as older versions that are kept for regressing a node back to a previous boot image or software package version.

A node performing an initial boot begins communication with the master node by requesting a boot image and software package download from the master node. The master node retrieves the node's software configuration information from the node information database using the node's type and/or location information.

The master node has the ability to categorize nodes into classes. All of the nodes in a particular class of nodes can have the same software configuration. Classes may contain nodes that have differing processor types.

The master node then finds the boot image and software packages in the software package database using the software version information contained in the node's software configuration information. The master node sends the boot image and software packages to the node.

The node stores the boot image and software packages in its local persistent storage. Software package version information is extracted from the software packages and stored in the local persistent storage. The node then reboots into the boot image from the local persistent storage and verifies the software package versions with the master node.

The master node compares the node's software package version information with the stored versions for the node. If the node has the correct software, then the master node notifies the node that it can complete the boot sequence and execute the software packages stored in the local persistent storage.

If the node does not have the correct software package versions, the master node retrieves the correct software packages from the software package database and sends them to the node. The node receives the software packages and stores them in local persistent storage. The node then continues with the boot phase using the software packages stored in local persistent storage.

Alternatively, the node can initially request a boot image from the master node and uncompress and load the image into RAM. The node runs the boot image in RAM. If the node needs to store a boot image in persistent storage, it will again request a boot image from the master node when it requests a software package download.

The node, based on a command from the master node, can execute the software packages without storing them in the local persistent storage device. This allows the master node to download test software packages to the node and temporarily run the node using the test software packages. When the node reboots, the test software packages will no longer exist on the node The user installs a composite image onto the master node which, when executed, creates boot images, software packages, and node information. The software packages contain version information, dependency information, and other metadata information pertaining to the software in the package. The master node places the boot images and software packages in the software package database and the node information in the node information database.

In other aspects, the invention encompasses a computer apparatus and a computer-readable medium configured to carry out the foregoing steps.

2.0 Structural and Functional Description 2.1 Software Loading and Initialization in a Router System Multi-node computer systems encompass many different configurations. A common multi-node system is exemplified in telecommunications switches and routers. Shelf or rack-based routers contain many different types of processors in the cards that plug into the shelf. A master control card will typically have a different control processor than the line cards installed in the shelf. The master control card controls the operations of the line cards and typically requires a more powerful processor than the line cards. Further, each line card may have a different control processor configuration depending on the line card's purpose.

The cards in the shelf are interconnected through a backplane that provides an isolated and custom network between the cards. There may also be multiple shelves interconnected via the backplanes to perform large routing tasks.

There is a need to distribute, and then make persistent, a chosen set of system software entities onto each card (node) in a multi-node router system. The fact that the system software is composed of sets of modular components, and not single monolithic images, makes this even more challenging. FIG. 1 shows an embodiment of the invention implemented in a router system 101. The router system 101 uses a backplane 102 to interconnect all of the nodes 103-108 in the system. Backplanes are communicably connected together to form multi-shelf systems. A master node 103 is typically the most advanced processor card in the shelf. Other nodes 104-108 are line cards or other assorted cards having possibly different processors controlling each card's functions.

Each node communicates across the backplane 102. The master node 103 detects each card type and location through the backplane's 102 hardware.

The invention's master node 103 stores information regarding each card's type and software configuration. The master node 103 also stores versions of software packages that are used by the nodes in the router system 101. When the router system 101 first boots up, the master node is tasked with loading and initializing each node with the proper versions of software. It is the software loading and initialization phase that brings the router system 101 to a steady state during the boot stage of the system. Each node requires a potentially unique boot image, plus a modular set of potentially unique software packages, to make it complete and functional. The invention's infrastructure is capable of delivering software files that match the diversity of requirements of individual nodes.

The boot image and the software packages need to be burned into local persistent storage, e.g., flash memory, on each node 104-108 before the router system 101 can be declared "ready for use". Once ready for use, recovering from a power outage, for example, takes a minimal amount of time regardless of the number of nodes in the system, thereby providing a turnkey system.

The invention dynamically adjusts, at the time that a node starts, the particular software that the node receives and boots up with. In a pristine system, each node 104-108 is a blank slate and requires software to be loaded for it to operate. The master node 103 becomes aware of the node through a hardware register on the backplane 102 or through a message from the node as it boot ups from its basic BIOS.

The master node 103 communicates with a node 104 after the node 104 boots up with an appropriate boot image downloaded from the master node 103. The node 104 requests a software package download from the master node 103. The master node determines the node's card type and/or location and, based on the master node's stored node configuration database, the master node 103 determines the proper software required for the node 104. The master node 103 then retrieves the proper software packages and boot software from its storage and sends the packages to the node 104.

The node 104 receives the software packages and, based on a command from the master node 103, can cache, or store, the software packages in its local persistent storage device along with the software package version information extracted from the software packages. The node 104 then boots up into normal operational mode using the software packages.

The purpose of a node not storing the software packages in its persistent storage device allows the master node 103 to download test software packages to the node and temporarily run the node using the test software. When the node reboots, the test software will no longer exist on the node.

Once nodes within the router system 101 have been initialized, the invention can still dynamically adjust a node's software configuration. A node will negotiate with the master node 103 as to what software it will boot with each time it boots. The master node 103 decides whether the node's current software packages are current and whether any software package updates are required.

Most shelf-based router systems use multiple master nodes to ensure failover operational reliability. A master node is selected by the user or is elected by other potential master nodes. Line cards, on the other hand, do not have to be redundant, but therefore require the ability to run in a continuous manner.

2.2 Software Loading and Initialization in a Networked Computer System

Figure 2:
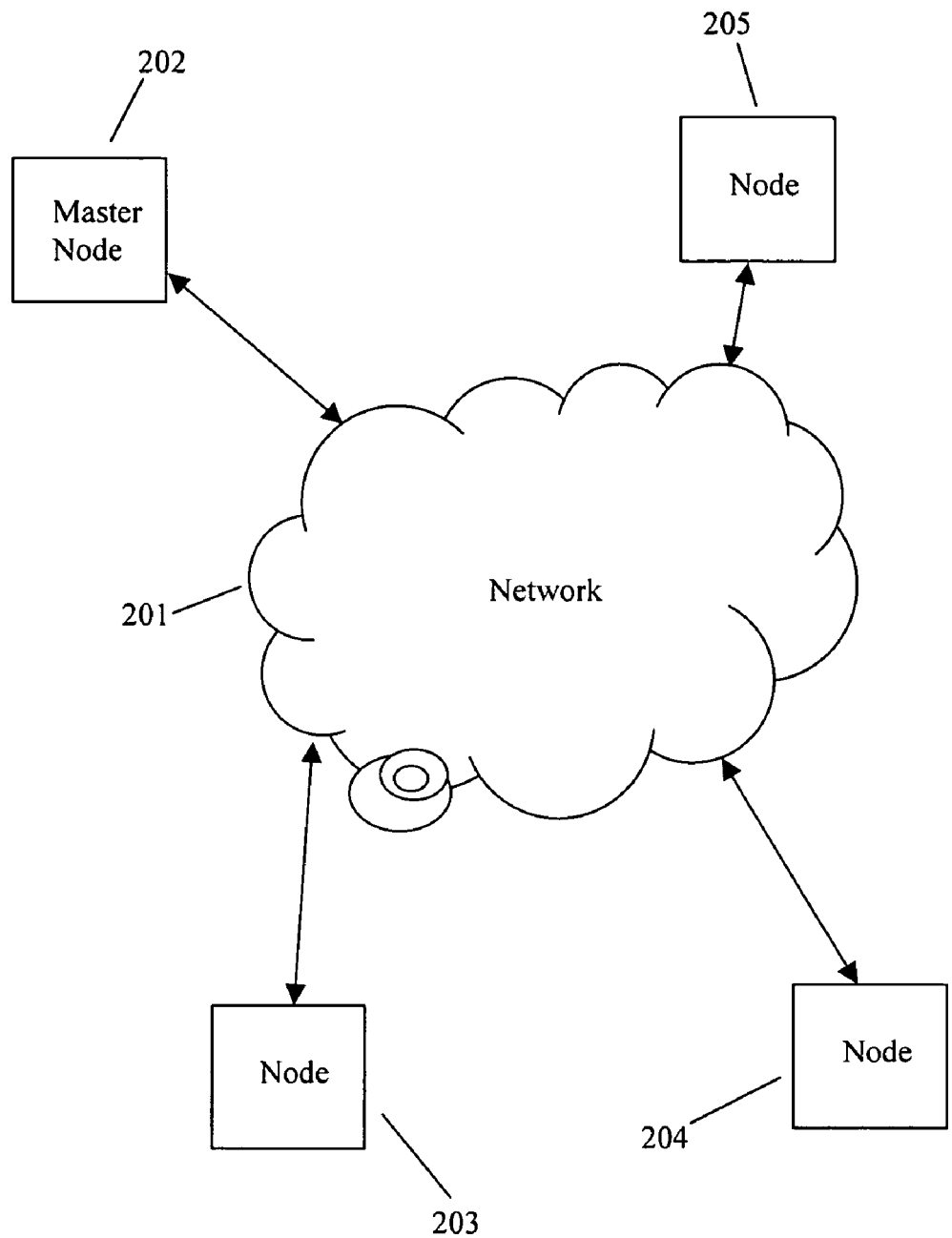
FIG. 2 is a block diagram that illustrates a multi-node computer system where nodes communicate through a computer network to perform software loading and initialization according to the invention.

Referring to FIG. 2, the invention can be extended to a more common computer network 201 such as an intranet or the Internet. A master node 202 communicates across the computer network 201 with nodes 203-205. The master node 202 initializes the nodes 203-205 at boot phase. The master node 202 detects a node's presence on the computer network 201 via a message sent from the node 203 to the master node 202.

The master node 202 receives the node's type information from the node 203. On initial boot, the master node 202 sends the node 203 boot software and software packages appropriate for the node's processor type. The node 203 reboots into the boot software and requests a software version verification from the master node 202. The master node 202 retrieves the appropriate software package version information for the node from its database using the node's type information. The master node verifies the software version information and tell the node 203 to continue booting.

The node 203 can cache the software packages in its local persistent storage device along with the software package version information extracted from the software packages.

Alternatively, on initial boot, the master node 202 sends the node 203 boot software appropriate for the node's processor type and/or location. The node 203 reboots into the boot software and requests a software package download from the master node 202. The master node 202 retrieves the appropriate software packages for the node using the node's type and/or location information. The master node then sends the retrieved software packages to the node 203.

The node 203 receives the software packages and (as discussed above), based on a command from the master node 202, can cache, or store, the software packages in its local persistent storage device along with the software package version information extracted from the software packages. The node 203 executes the software packages to begin normal operation.

In another alternative embodiment, on initial boot, the master node 202 sends the node 203 boot software appropriate for the node's processor type and/or location. The node 203 uncompresses the boot image and places it into RAM. The node 203 reboots into the boot software and requests a software package download from the master node 202. If the node 203 finds that it is to save a boot image in its persistent storage, it will request a boot software download also. The master node 202 retrieves the appropriate software packages (and boot software, if requested) for the node using the node's type and/or location information. The master node then sends the retrieved software packages (and boot software, if requested) to the node 203.

The node 203 receives the software packages and (as discussed above), based on a command from the master node 202, can cache, or store, the software packages (and boot software, if required) in its local persistent storage device along with the software package version information extracted from the software packages. The node 203 executes the software packages to begin normal operation.

The purpose of a node not storing the software packages in its persistent storage device is that it allows the master node 202 to download test software packages to the node and temporarily run the node using the test software. When the node reboots, the test software will no longer exist on the node.

The invention can dynamically adjust a node's software configuration. A node will negotiate with the master node 202 as to what software it will boot with each time it boots. The master node 202 decides whether the node's current software packages are current and whether any software package updates are required.

2.3 Master Node Interaction

Figure 3:
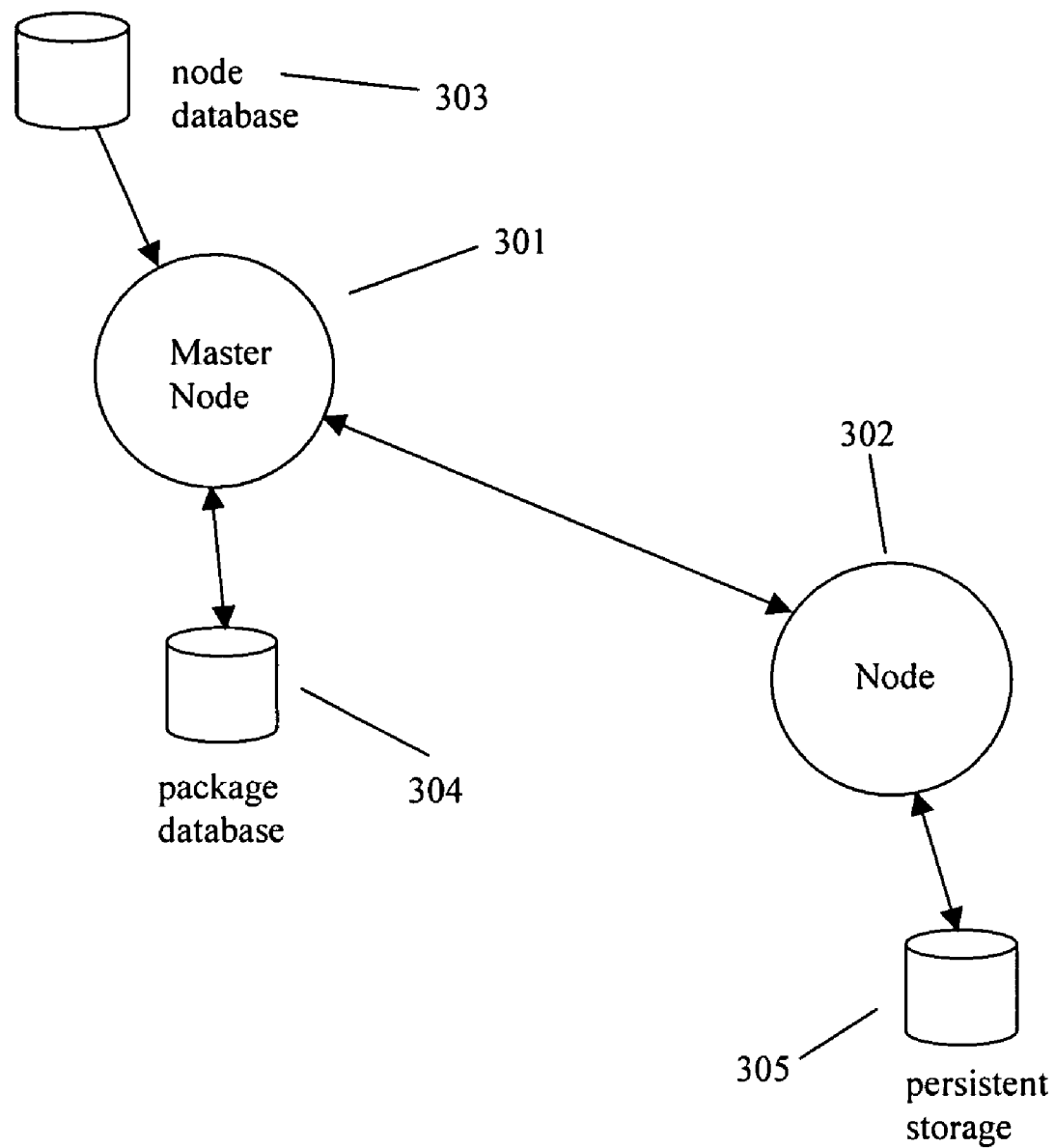
FIG. 3 is a block diagram that illustrates a master node and its associated databases communicating with a networked node according to the invention.

FIG. 3 shows a master node 301 interacting with a node 302. The master node 301 contains a database of software packages 304 that contains versions of software packages that can be used by nodes in the network. Each software package contains metadata that describes the package, its dependencies, and version number. Software packages range from the base operating system to operating software that controls the node's ability to operate, for example, to switch circuits for routing a connection through a backplane.

A second database 303 contains information pertaining to what software is on the nodes that are connected to the master node 301. The master node 301 tracks the software configuration of each of the nodes. The master node 301 has the ability to categorize nodes into classes. All of the nodes in a particular class of nodes can have the same software configuration. Classes may contain nodes that have differing processor types. The master node 301 distributes software packages that are specific to each node's processor type and function. This allows the master node 301 to easily update all nodes within a class. The invention has a broad flexibility to have differing software configurations within a class of nodes or an individual node.

The master node 301 can place a specific node 302 into a test mode by telling the node to download a certain test suite from the master node 301. The node database 303 allows the master node 301 to track special case nodes as well as a normal operation node.

The invention also allows a user to designate the software packages for single nodes or classes of nodes through the master node 301.

The node 302 can store software packages and version information of software packages in its local persistent storage 305. The master node 301 instructs the node 302 when to perform such an operation.

When a node 302 boots up with software packages and version information stored in its local storage 305, the node 302 negotiates with the master node 301 to decide what software packages to use. The node 305 passes the software version information that it believes it should be running to the master node 301. The master node 301 checks with its node database 303 to determine the proper software packages for the node 302. If the node has the proper software packages, the master node tells the node to boot using its resident software packages.

If the node 302 does not have the proper software packages, then the master node instructs the node 302 to download specific versions of software packages from the master node 301. The node 302 is instructed by the master node 301 to save the software packages and associated version information in its local storage 305.

Figure 4:
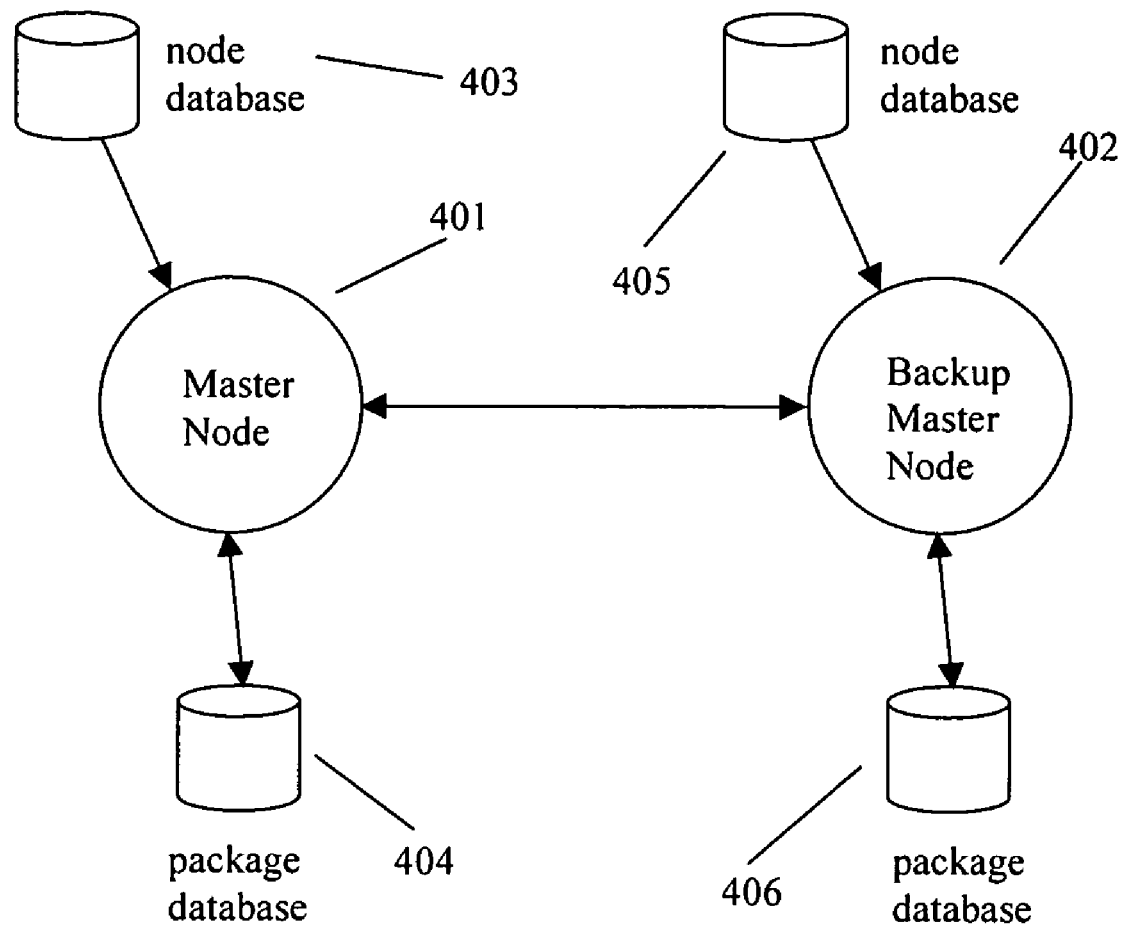
FIG. 4 is a block diagram that illustrates a master node communicating with a backup master node according to the invention.

Referring to FIG. 4, the invention's master node 401 backs up all potential backup master nodes 402 in the system to provide failover redundancy. The master node has a node database 403 and a software package database 404 stored locally. Backup master nodes also have a node database 405 and a software package database 406 stored locally. The master node 401 periodically sends database update information to the backup master node 402. This update can also occur on demand by the backup master node 402 or whenever a database is updated.

The master node 401 sends the backup node 402 node database updates from its node database 403 to the backup master node 402. The backup master node 402 stores the node database updates in its node database 405.

The master node 401 also sends the backup node 402 software package database updates from its package database 404 to the backup master node 402. The backup master node 402 stores the software package database updates in its package database 406.

If the master node 401 goes down or is disabled for any reason during runtime, the backup master node 402 takes over the master node's duties. The master node 401 releases its control and the backup master node 402 becomes the master node.

In the case of multiple backup master nodes, one will be elected by the other nodes to be master node or will assume the master node role. The user can also designate which backup master node will be next in line.

2.4 Software Package Loading

Figure 5:
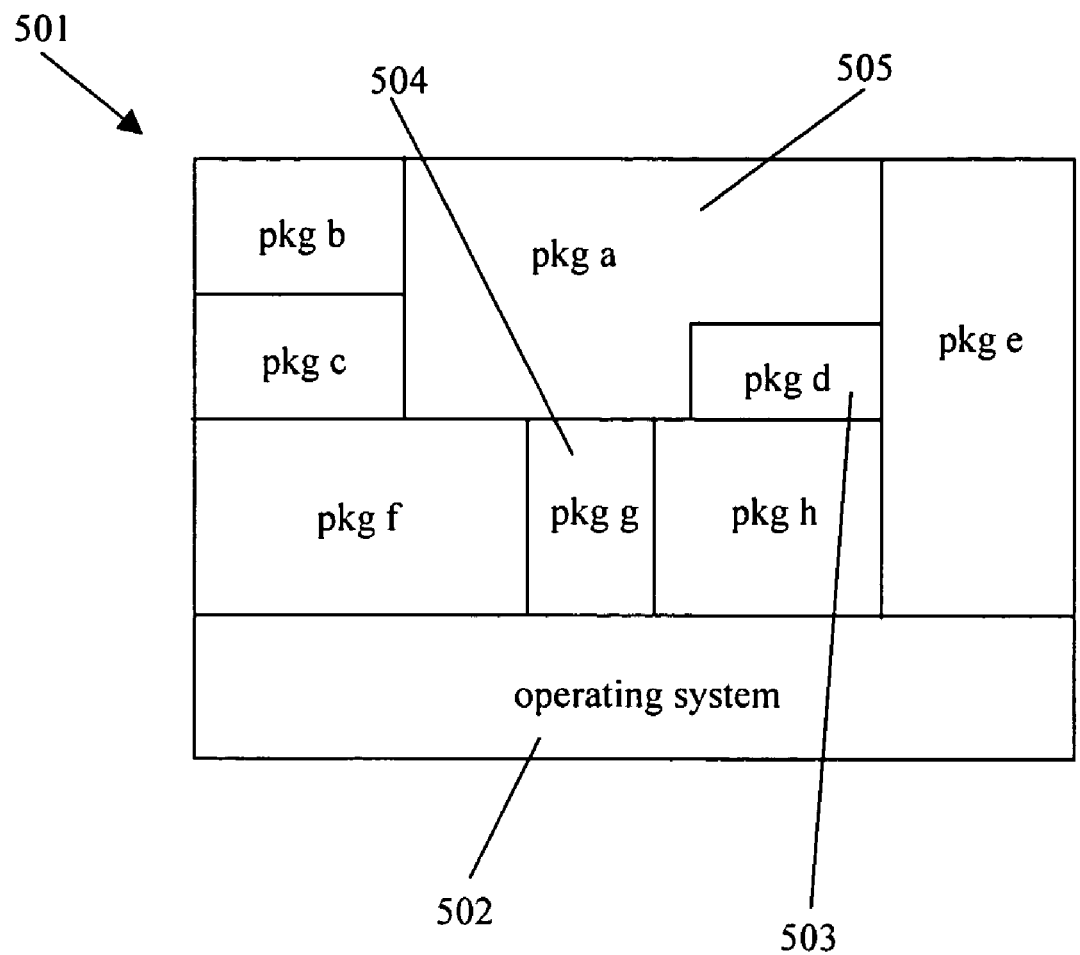
FIG. 5 is a block diagram that illustrates a software entity and its associated software packages according to the invention.

FIG. 5 shows how software entities 501 may be constructed. Each software package is typically intertwined with other packages in their operational modes. A node can be instructed to load all software entities 501 in its operational software suite from the master node or it can be instructed to load specific software packages 502-505. The node will boot using the software packages that it has downloaded from the master node.

Each package in the operational software entities 501 has version information (metadata) attached to it that is extracted by the node upon receipt. The node saves the version information when it is told to by the master node. This allows the node to remember what software version state it was in at the last save. The version information is used by the node to negotiate with the master node about what software packages it should be booting with.

Software entities are divided into boot images and application packages. A boot image is customized for the type of node and provides basic low-level communications amongst the nodes.

The master node controls the distribution and burning in of software to all nodes in the network. When the user selects the master node, he sets a monitor variable telling the master node to "prepare all nodes now", i.e., burn all nodes now. The user also boots a main composite boot image on that master node.

The composite boot image self-extracts itself on the master node's local storage into boot images for all node types and packages for all node types. All of the other nodes in the system are automatically reset. The nodes then request that they be serviced by the master node with appropriate system software. The appropriate, and potentially unique, boot image and package set are delivered to each node.

Once all nodes have indicated that they are "ready" and that their own software has been persistently stored, the master node initiates a system-wide reset and a warm boot is executed.

The warm boot is equivalent to powering off, then on, the entire system. Each node boots to a certain stage and then waits for validation from the master node.

The master node independently boots and starts validating the software entities persistently stored on each remote node. Once validation is complete, the node will execute its software packages. Since only validation, and not download, is required during the warm boot, a scalable boot architecture is thereby achieved.

Figure 6:
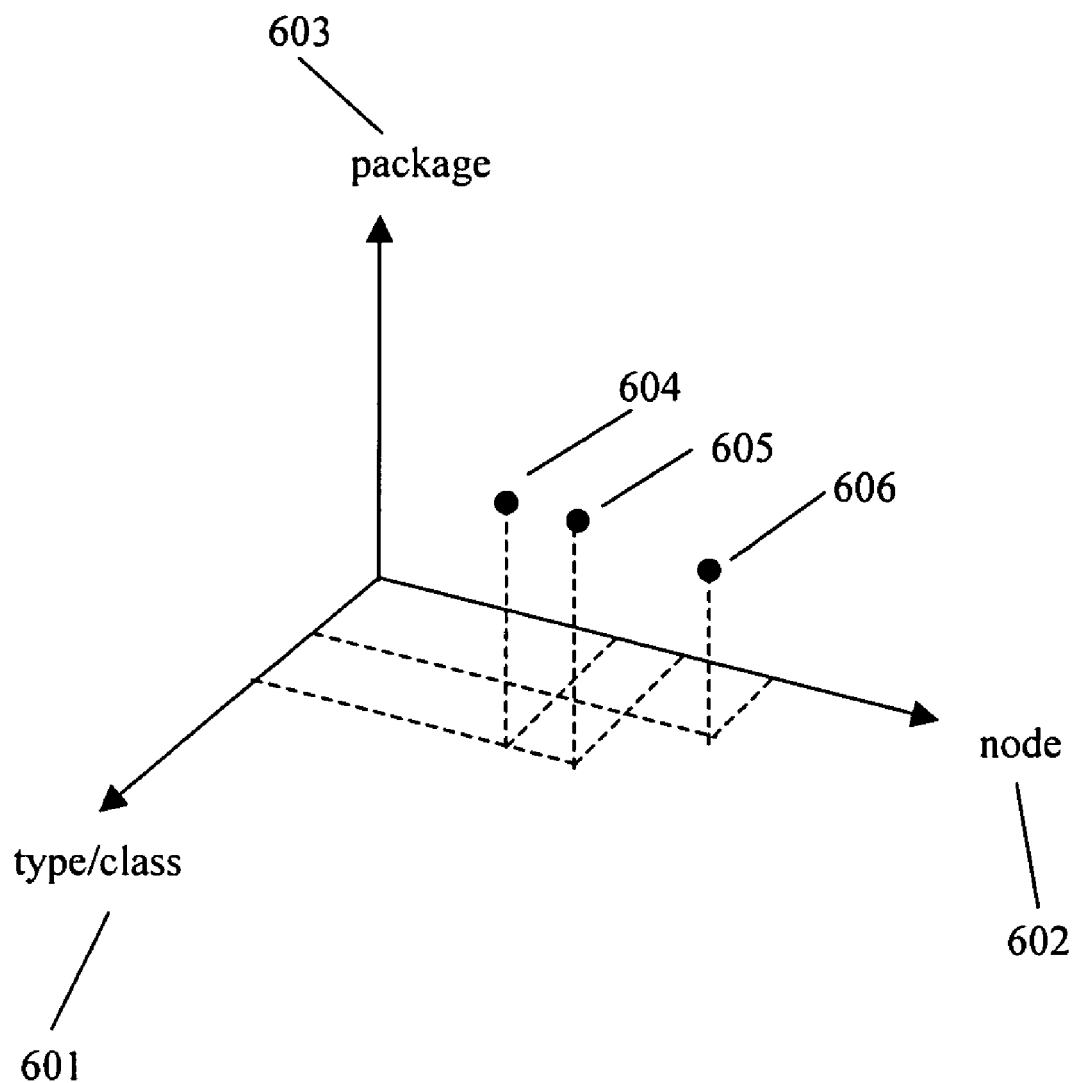
FIG. 6 is a diagram that illustrates a three-dimensional representation of software configurations for nodes and classes of nodes according to the invention.

With respect to FIG. 6, the invention provides a master node with a large amount of flexibility to configure the software configuration of nodes within a system. The master node (or user) can define what software packages 603 are required for a node 602. Nodes can be treated individually or placed in a class 601. The combination of the three characteristics can uniquely define a node's software environment.

For example, nodes A 604 and B 605 are placed in the same class and have the same software package configuration. Node D 606 is a unique node that has its own software package configuration.

2.5 Task Analysis

Figure 7:
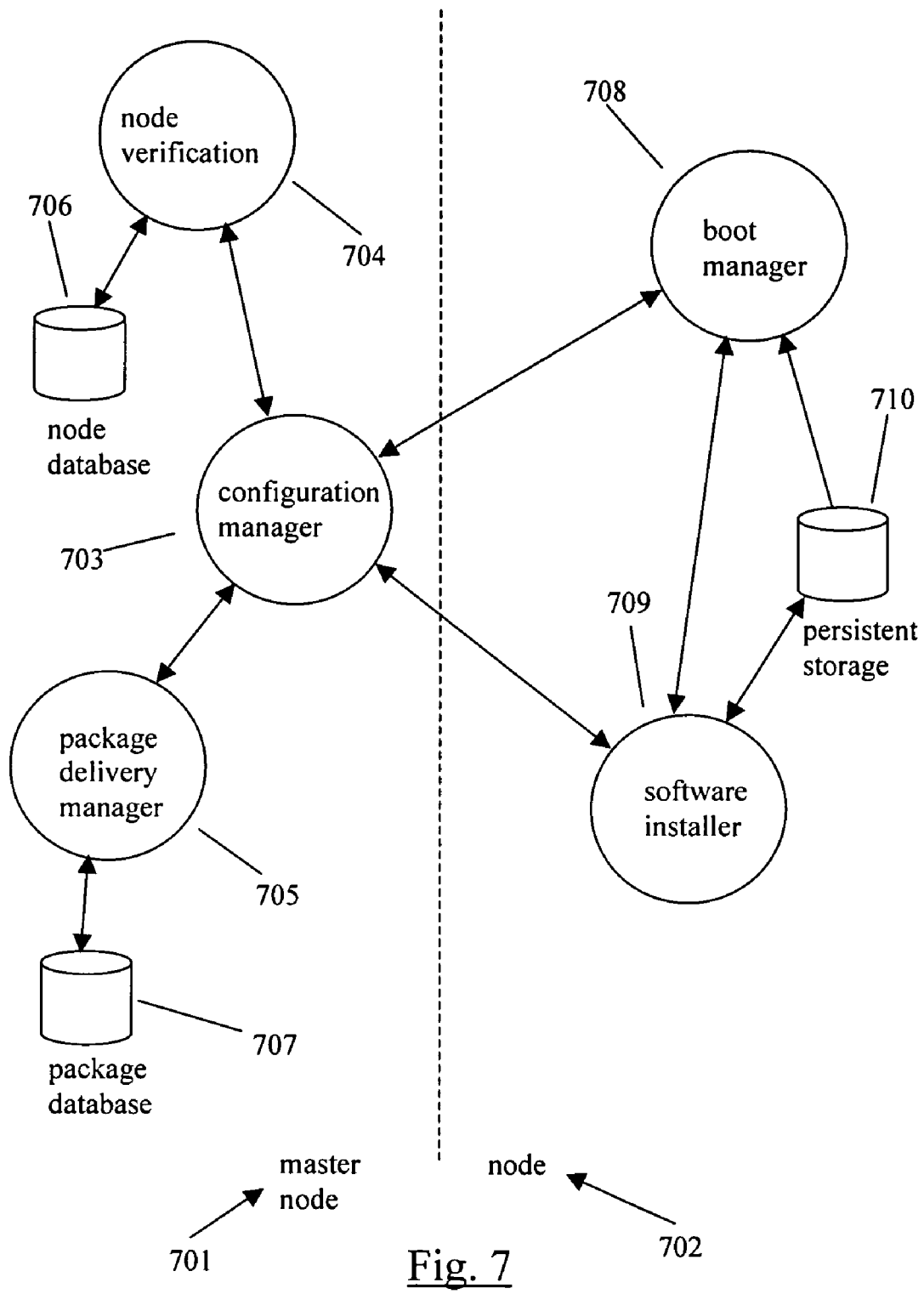
FIG. 7 is a block diagram that illustrates a task viewpoint of a master node and a node according to the invention.

FIG. 7 shows a task oriented viewpoint of the invention's master node 701 and node 702. The user installs a composite image onto the master node which, when executed, creates boot images, software packages, and node information. The software packages contain version information, dependency information, and other metadata information pertaining to the software in the package. The configuration manager module 703 distributes the boot images, software packages, and node information to the proper databases 706, 707. Updates are installed on the master node in the same manner by the user.

The master node 701 provides a node database 706 that records the preferred software version information, type, and other pertinent information (e.g., present/not present, test mode, current installed software versions, etc.) for each node in the system. The node database 706 is preloaded with the preferred software version information by the user via the composite image and is updated as nodes are added or changed. The configuration manager 703 passes the node information obtained from the composite image to the node verification module 704. The node verification module 704 installs the node information into the node database 706.

The master node 701 also provides a package database 707 that contains the software packages and boot images for the nodes in the system. As with the node database 706, the package database 707 is preloaded with the software packages and boot images via the composite image. The configuration manager 703 passes the boot images and software packages extracted from the composite image to the package delivery manager module 705. The package delivery manager module 705 installs the boot images and software packages into the package database 707. The package database 707 is updated in the same manner whenever an update is installed by the user. The package database 707 contains all of the possible boot images and software packages that the nodes in the system will be using as well as older versions that are kept for regressing a node back to a previous boot image or software package version.

The boot manager 708 on the node 702 must boot the node to begin communication with the master node 701. During a pristine boot (when the node has no boot image or software packages stored in its persistent storage 710), once the node 702 is running its base boot code, the node 702 requests a boot image and software package download from the master node 701. The software installation module 709 sends a boot image and software package download request to the configuration manager module 703. The software installer module 709 also sends the configuration manager module 703 the node's type information (e.g., card type, processor type, location, etc.). This step is not performed if the master node 701 has full visibility of the node's type and shelf slot via hardware in a backplane, for example.

Alternatively, the node 702 requests the software packages by providing a list of functional features that the node is interested in (e.g., parser files, processor specific-architecture binaries, routing protocol files, etc.). This means that the selection of the boot image is based on type/location, while the selection of software packages and package contents is based on features. Nodes of the same type may have different feature requirements (and hence receive different software) if, for example, their firmware is programmed differently or they are dynamically assigned a different role.

The configuration manager module 703 sends the node verification module 704 the node's type information to obtain the node's software configuration information. The node verification module 704 finds the node's software configuration information in the node database 706 using the node's type information. The node 702 can be a member of a class which dictates the node's software configuration or can be individually configured. The node verification module 704 passes the node's software configuration information to the configuration manager module 703.

In the alternative embodiment described above, the previous steps change slightly, the configuration manager module 703 sends the node verification module 704 the node's functional features request to obtain the node's software configuration information. The node verification module 704 creates the node's software configuration information based on the node's requested features by matching the node's requested features with package and file information in the node database 706. The node verification module 704 passes the node's software configuration information to the configuration manager module 703.

The configuration manager module 703 sends the package delivery manager module 705 the node's software configuration information to obtain the proper boot image and software packages for the node 702. The package delivery manager module 705 receives the node's software configuration information and finds the boot image and software packages in the package database 707 using the software version information contained in the node's software configuration information. The package delivery manager module 705 passes the boot image and software packages to the configuration manager module 703.

The configuration manager module 703 sends the boot image and software packages to the software installer module 709. The software installer module 709 stores the boot image and software packages in the persistent storage 710. The software version information is extracted from the software packages and stored in the persistent storage 710. The software installer module 709 signals the boot manager module 708 to reboot the node.

The boot manager module 708 reboots the node into the boot image from the persistent storage 710 and the boot manager module 708 signals the software installer module 709 to verify the software package versions with the master node 701. The software installer module 709 retrieves the stored software version information from the persistent storage 710 and requests verification of the software packages from the configuration manager module 703.

The configuration manager module 703 requests verification of the software version information for the node from the node verification module 704. The node verification module 704 compares the node's software version information with the stored versions for the node and returns the result to the configuration manager module 703. If the node has the correct software, then the configuration manager module 703 notifies the software installer module 709 that it can complete the boot sequence. The configuration manager module 703, in turn, notifies the boot manager module 708 that it can execute the software packages stored in the persistent storage 710.

If the node does not have the correct software versions, the configuration manager module 703 retrieves the correct software packages from the package delivery manager module 705, passing the package delivery manager module 705 the desired software package names and their version numbers. The package delivery manager module 705 finds the software packages in the package database 707 and sends them to the configuration manager module 703. The configuration manager module 703 sends the software packages to the software installer module 709.

The software installer module 709 receives the software packages and stores them in persistent storage 710. The software installer module 709 then notifies the boot manager module 708 that it can continue with the boot phase using the software packages stored in persistent storage 710.

Alternatively, during a pristine boot, the node 702 runs its base boot code and requests a boot image from the master node 701. The boot manager 703 sends a boot image download request to the configuration manager module 703. The configuration manager module 703 sends the node verification module 704 the node's type information to obtain the node's software configuration information. The node verification module 704 finds the node's software configuration information in the node database 706 using the node's type information. The node verification module 704 passes the node's software configuration information to the configuration manager module 703.

The configuration manager module 703 sends the package delivery manager module 705 the node's software configuration information to obtain the proper boot image for the node 702. The package delivery manager module 705 receives the node's software configuration information and finds the boot image in the package database 707 using the software version information contained in the node's software configuration information. The package delivery manager module 705 passes the boot image and software packages to the configuration manager module 703.

The configuration manager module 703 sends the boot image to the boot manager 703. The boot manager 703 executes the boot image.

Once the boot image is running, the software installation module 709 sends a boot image and software package download request to the configuration manager module 703. A boot image request is made if the node 702 finds that it is configured to save a boot image in the persistent storage 710. The software installer module 709 also sends the configuration manager module 703 the node's type information (e.g., card type, processor type, location, etc.). This step is not performed if the master node 701 has full visibility of the node's type and shelf slot via hardware in a backplane, for example.

Alternatively, the node 702 requests the software packages by providing a list of functional features that the node is interested in (e.g., parser files, processor specific-architecture binaries, routing protocol files, etc.). This means that the selection of the boot image is based on type/location, while the selection of software packages and package contents is based on features. Nodes of the same type may have different feature requirements (and hence receive different software) if, for example, their firmware is programmed differently or they are dynamically assigned a different role.

The configuration manager module 703 sends the node verification module 704 the node's type information to obtain the node's software configuration information. The node verification module 704 finds the node's software configuration information in the node database 706 using the node's type information. The node 702 can be a member of a class which dictates the node's software configuration or can be individually configured. The node verification module 704 passes the node's software configuration information to the configuration manager module 703.

In the alternative embodiment described above, the previous steps change slightly, the configuration manager module 703 sends the node verification module 704 the node's features request to obtain the node's software configuration information. The node verification module 704 creates the node's software configuration information based on the node's requested features by matching the node's requested features with package and file information in the node database 706. The node verification module 704 passes the node's software configuration information to the configuration manager module 703.

The configuration manager module 703 sends the package delivery manager module 705 the node's software configuration information to obtain the proper boot image and software packages for the node 702. The package delivery manager module 705 receives the node's software configuration information and finds the boot image and software packages in the package database 707 using the software version information contained in the node's software configuration information. The package delivery manager module 705 passes the boot image and software packages to the configuration manager module 703.

The configuration manager module 703 sends the boot image and software packages to the software installer module 709. The software installer module 709 stores the boot image and software packages in the persistent storage 710. The software version information is extracted from the software packages and stored in the persistent storage 710. The software installer module 709 signals the boot manager module 708 to reboot the node.

The boot manager module 708 reboots the node into the boot image from the persistent storage 710 and the boot manager module 708 signals the software installer module 709 to verify the software package versions with the master node 701. The software installer module 709 retrieves the stored software version information from the persistent storage 710 and requests verification of the software packages from the configuration manager module 703.

The configuration manager module 703 requests verification of the software version information for the node from the node verification module 704. The node verification module 704 compares the node's software version information with the stored versions for the node and returns the result to the configuration manager module 703. If the node has the correct software, then the configuration manager module 703 notifies the software installer module 709 that it can complete the boot sequence. The configuration manager module 703, in turn, notifies the boot manager module 708 that it can execute the software packages stored in the persistent storage 710.

If the node does not have the correct software versions, the configuration manager module 703 retrieves the correct software packages from the package delivery manager module 705, passing the package delivery manager module 705 the desired software package names and their version numbers. The package delivery manager module 705 finds the software packages in the package database 707 and sends them to the configuration manager module 703. The configuration manager module 703 sends the software packages to the software installer module 709.

The software installer module 709 receives the software packages and stores them in persistent storage 710. The software installer module 709 then notifies the boot manager module 708 that it can continue with the boot phase using the software packages stored in persistent storage 710.

3.0 Implementation Mechanisms—Hardware Overview

Figure 8:
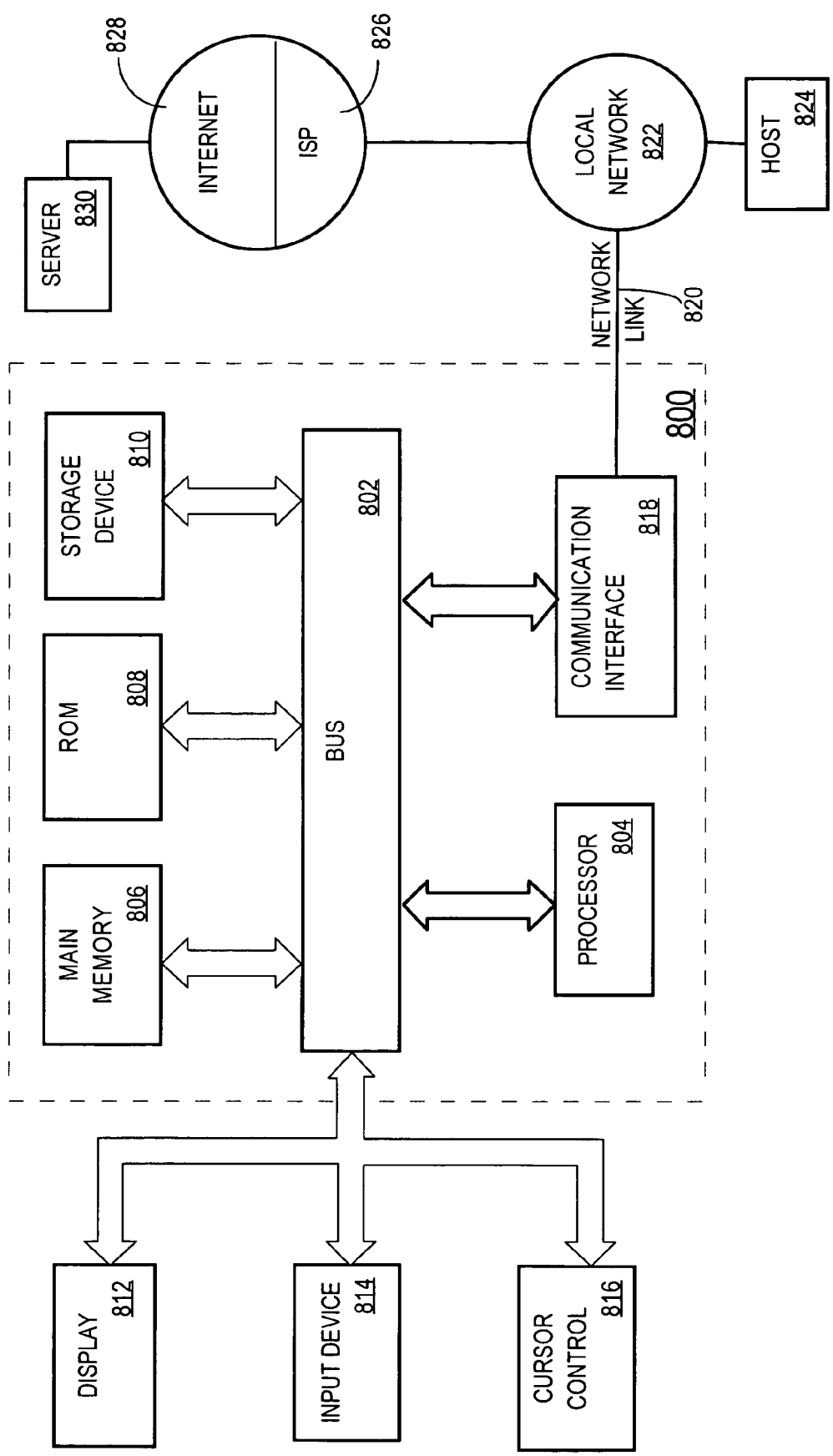
FIG. 8 is a block diagram that illustrates a computer system upon which an embodiment may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for software loading and initialization in a distributed network. According to one embodiment of the invention, software loading and initialization in a distributed network is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for software loading and initialization in a distributed network as described herein.

The received code may be executed by processor 804 as it is received, and/or stored in storage device 810, or other non-volatile storage for later execution. In this manner, computer system 800 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of software loading and initialization in a distributed network of nodes, the method comprising:
    persistently storing, in a first storage of a master node, a plurality of software packages and a plurality of boot images, wherein the plurality of software packages and the plurality of boot images will be used by the nodes in the distributed network;
    persistently storing, in a second storage of the master node, software version information and node type information for each node in the distributed network;
    receiving, at the master node, a request for a boot image and software packages from a node, in the distributed network, that is performing an initial boot;
    based on the request, the master node determining software version information of the node to retrieve from the second storage;
    the master node retrieving the software version information of the node from the second storage;
    the master node determining, based on the software version information of the node, a boot image of the plurality of boot images and one or more software packages of the plurality of software packages to extract from the first storage;
    the master node extracting the boot image and the one or more software packages from the first storage;
    the master node delivering, to the node, the boot image and the one or more software packages;
    wherein said node:
        (a) stores the boot image and the one or more software packages in its local persistent storage,
        (b) extracts software version information from the one or more software packages and stores the software version information in the local persistent storage,
        (c) reboots and executes the boot image stored in the local persistent storage, and
        (d) in response to executing the boot image, verifies the software version information with said master node by sending the software version information to the master node;
    the master node receiving the software version information from the node;
    in response to receiving the software version information, the master node determining whether the node has the correct software versions;
    in response to the master node determining that said node does not have the correct software versions, then the master node retrieving correct software packages from the first storage and sending the correct software packages to said node, wherein said node stores the correct software packages in the local persistent storage and completes booting by executing the correct software packages stored in the local persistent storage.

2. A method as recited in claim 1, wherein said node, based on a command from said master node, does not store the one or more software packages in its local persistent storage device, allowing said master node to download test software packages to said node and temporarily run said node using the test software packages, and wherein when said node reboots, the test software packages will no longer exist on said node.

3. A method as recited in claim 1, wherein if said node has the correct software versions, then said node completes booting by executing the one or more software packages stored in the local persistent storage.

4. A method as recited in claim 1, wherein the master node has the ability to categorize nodes into classes where all of the nodes in a particular class of nodes have the same software configuration and may have differing processor types.

5. A method as recited in claim 1, wherein each of the one or more software packages contains version information, dependency information, and other metadata information pertaining to software in the package.

6. A method as recited in claim 1, wherein the boot image is customized for a particular type of node and provides basic low-level communications.

7. A method as recited in claim 1, further comprising:
    executing a composite image, that is installed by a user onto said master node, to create a subset of the plurality of boot images, a subset of the plurality of software packages, and node information; and
    placing the subset of the plurality of boot images and the subset of the plurality of software packages in the first storage and the node information in the second storage.

8. A method as recited in claim 1, wherein the master node retrieving the software version information creates the software version information from the second storage based on functional features included in the request.

9. A method as recited in claim 1, wherein:
    the request includes node type information of the node;
    the master node determining software version information of the node includes the master node using the node type information of the node to determine the software version information of the node.

10. A computer-readable storage medium carrying one or more sequences of instructions for software loading and initialization in a distributed network of nodes, which instructions, when executed by one or more processors, cause the one or more processors to perform:
    persistently storing, in a first storage of a master node, a plurality of software packages and a plurality of boot images, wherein the plurality of software packages and the plurality of boot images will be used by the nodes in the distributed network;
    persistently storing, in a second storage of the master node, software version information and node type information for each node in the distributed network;
    receiving, at the master node, a request for a boot image and software packages from a node, in the distributed network, that is performing an initial boot;
    based on the request, the master node determining software version information of the node to retrieve from the second storage;
    the master node retrieving the software version information of the node from the second storage;
    the master node determining, based on the software version information of the node, a boot image of the plurality of boot images and one or more software packages of the plurality of software packages to extract from the first storage;

the master node extracting the boot image and the one or more software packages from the first storage;

the master node delivering, to the node, the boot image and the one or more software packages, wherein said node:

(a) stores the boot image and the one or more software packages in its local persistent storage, (b) extracts software version information from the one or more software packages and stores the software version information in the local persistent storage, (c) reboots and executes the boot image stored in the local persistent storage, and (d) in response to executing the boot image, verifies the software version information with said master node by sending the software version information to the master node;

the master node receiving the software version information from the node;

in response to receiving the software version information, the master node determining whether the node has the correct software versions;

in response to the master node determining that said node does not have the correct software versions, then the master node retrieving correct software packages from the first storage and sending the correct software packages to said node, wherein said node stores the correct software packages in the local persistent storage and completes booting by executing the correct software packages stored in the local persistent storage.

11. A computer-readable storage medium as recited in claim 10, wherein said node, based on a command from said master node, does not store the one or more software packages in its local persistent storage device, allowing said master node to download test software packages to said node and temporarily run said node using the test software packages, and wherein when said node reboots, the test software packages will no longer exist on said node.

12. A computer-readable storage medium as recited in claim 10, wherein if said node has the correct software versions, then said node completes booting by executing the one or more software packages stored in the local persistent storage.

13. A computer-readable storage medium as recited in claim 10, wherein the master node has the ability to categorize nodes into classes where all of the nodes in a particular class of nodes have the same software configuration and may have differing processor types.

14. A computer-readable storage medium as recited in claim 10, wherein each of the one or more software packages contains version information, dependency information, and other metadata information pertaining to software in the package.

15. A computer-readable storage medium as recited in claim 10, wherein the boot image is customized for a particular type of node and provides basic low-level communications.

16. A computer-readable storage medium as recited in claim 10, further comprising:

executing a composite image, that was installed by a user, to create a subset of the plurality of boot images, a subset of the plurality of software packages, and node information; and placing the subset of the plurality of boot images and the subset of the plurality of software packages in the first storage and the node information in the second storage.

17. A computer-readable storage medium as recited in claim 10, wherein the master node retrieving the software version information creates the software version information from the second storage based on functional features included in the request.

18. A computer-readable storage medium as recited in claim 10, wherein:

the request includes node type information of the node;

the master node determining software version information of the node includes the master node using the node type information of the node to determine the software version information of the node.

19. An apparatus of software loading and initialization in a distributed network of nodes, comprising:

a master node;

a first storage on said master node for persistently storing a plurality of software packages and a plurality of boot images that the nodes in the distributed network will use;

a second storage on said master node for persistently storing software version information and node type information for each node in the network;

means for receiving a request for a boot image and software packages from a node, in the distributed network, that is performing an initial boot;

means for the master node determining, based on the request, software version information of the node to retrieve from the second storage;

means for the master node retrieving the software version information of the node from the second storage;

means for the master node determining, based on the software version information of the node, a boot image of the plurality of boot images and one or more software packages of the plurality of software packages to extract from the first storage;

means for the master node extracting the boot image and the one or more software packages from the first storage; and means for the master node delivering, to the node, the boot image and the one or more software packages, wherein said node:

(a) stores the boot image and the one or more software packages in its local persistent storage, (b) extracts software version information from the one or more software packages and stores the software version information in the local persistent storage, (c) reboots and executes the boot image stored in the local persistent storage, and (d) in response to executing the boot image, verifies the software version information with said master node by sending the software version information to the master node;

means for the master node receiving the software version information from the node;

means for the master node determining, in response to receiving the software version information, whether the node has the correct software versions;

means for the master node retrieving, in response to the master node determining that said node does not have the correct software versions, correct software packages from the first storage and sending the correct software packages to said node, wherein said node stores the correct software packages in the local persistent storage and completes booting by executing the correct software packages stored in the local persistent storage.

20. An apparatus as recited in claim 19, wherein said node, based on a command from said master node, does not store the one or more software packages in its local persistent storage device, allowing said master node to download test software packages to said node and temporarily run said node using the test software packages, and wherein when said node reboots, the test software packages will no longer exist on said node.

21. An apparatus as recited in claim 19, wherein if said node has the correct software versions, then said node completes booting by executing the one or more software packages stored in the local persistent storage.

22. An apparatus as recited in claim 19, wherein the master node has the ability to categorize nodes into classes where all of the nodes in a particular class of nodes have the same software configuration and may have differing processor types.

23. An apparatus as recited in claim 19, wherein each of the one or more software packages contains version information, dependency information, and other metadata information pertaining to software in the package.

24. An apparatus as recited in claim 19, wherein the boot image is customized for a particular type of node and provides basic low-level communications.

25. An apparatus as recited in claim 19, further comprising:
means for executing a composite image to create a subset of the plurality of boot images, a subset of the plurality of software packages, and node information; and
means for placing the subset of the plurality of boot images and the subset of the plurality of software packages in the first storage and the node information in the second storage.

26. An apparatus as recited in claim 19, wherein said means for the master node retrieving the software version information creates the software version information from the second storage based on functional features included in the request.

27. An apparatus as recited in claim 19, wherein:
the request includes node type information of the node;
the means for the master node determining software version information of the node includes means for the master node using the node type information of the node to determine the software version information of the node.

28. A system for software loading and initialization in a distributed network of nodes, the system comprising:
a master node;
a node in the distributed network;
a first storage on the master node, wherein the first storage persistently stores a plurality of boot images and a plurality of software packages that nodes in the distributed network will use;
a second storage on the master node, wherein the second storage persistently stores software version information and node type information for each node in the distributed network;
one or more processors on the master node;
one or more sequences of instructions which, when executed by the one or more processors on the master node, cause the one or more processors on the master node to perform:
receiving a request for a boot image and software packages from the node that is performing an initial boot;
based on the request, the master node determining software version information of the node to retrieve from the second storage;
the master node retrieving the software version information of the node from the second storage;
the master node determining, based on the software version information of the node, a boot image of the plurality of boot images and one or more software packages of the plurality of software packages to extract from the first storage;
the master node extracting the boot image and the one or more software packages from the first storage;
the master node delivering, to the node, the boot image and the one or more software packages;
one or more other processors on the node;
one or more other sequences of instructions which, when executed by the one or more other processors on the node, cause the one or more other processors on the node to perform:
storing the boot image and the one or more software packages in local persistent storage of the node;
extracting software version information from the software packages;
storing the software version information in the local persistent storage;
executing the boot image, that is stored in the local persistent storage, to reboot the node;
in response to executing the boot image, verifying the software version information with the master node by sending the software version information to the master node;
one or more further sequences of instructions which, when executed by the one or more processors on the master node, cause the one or more processors on the master node to perform:
receiving the software version information from the node;
in response to receiving the software version information, determining whether the node has the correct software versions;
retrieving correct software packages from the first storage and sending the correct software packages to the node in response to determining that the node does not have the correct software versions;
one or more additional sequences of instructions which, when executed by the one or more processors on the node, cause the one or more processors on the node to perform:
in response to receiving the correct software packages from the master node, storing the correct software packages in the local persistent storage and executing the correct software packages stored in the local persistent storage to complete booting.

29. A system as recited in claim 28, wherein the node, based on a command from said master node, does not store the software packages in the local persistent storage device, allowing said master node to download test software packages to said node and temporarily run said node using the test software packages, and wherein when said node reboots, the test software packages will no longer exist on said node.

30. A system as recited in claim 28, wherein the one or more other sequences of instructions which, when executed by the one or more other processors, further cause the one or more other processors to perform executing the one or more software packages stored in the local persistent storage to complete booting if the node has the correct software versions.

31. A system as recited in claim 28, wherein the master node has the ability to categorize nodes into classes where all of the nodes in a particular class of nodes have the same software configuration and may have differing processor types.

32. A system as recited in claim 28, wherein each of the one or more software packages contains version information, dependency information, and other metadata information pertaining to software in the package.

33. A system as recited in claim 28, wherein the boot image is customized for a particular type of node and provides basic low-level communications.

34. A system as recited in claim 28, wherein the one or more sequences of instructions which, when executed by the one or more processors, further cause the one or more processors to perform:
   executing a composite image, that a user installs on the master node, to create a subset of the plurality of boot images, a subset of the plurality of software packages, and node information; and
   placing the subset of the plurality of boot images and the subset of the plurality of software packages in the first storage and the node information in the second storage.

35. A system as recited in claim 28, wherein the master node retrieving the software version information creates the software version information from the second storage based on functional features included in the request.

36. A system as recited in claim 28, wherein:
   the request includes node type information of the node;
   the master node determining software version information of the node includes the master node using the node type information of the node to determine the software version information of the node.

* * * * *